(12) United States Patent
Kogoh

(10) Patent No.: US 7,886,028 B2
(45) Date of Patent: Feb. 8, 2011

(54) METHOD AND SYSTEM FOR SYSTEM MIGRATION

(75) Inventor: Makoto Kogoh, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 11/773,467

(22) Filed: Jul. 5, 2007

(65) Prior Publication Data

US 2009/0012981 A1 Jan. 8, 2009

(51) Int. Cl.
*G06F 15/177* (2006.01)
(52) U.S. Cl. .................... 709/220; 707/609
(58) Field of Classification Search ........... 709/220; 707/101, 609
See application file for complete search history.

(56) References Cited

U.S. PATENT DOCUMENTS 6,151,608 A * 11/2000 Abrams ............... 707/679
7,313,560 B2 * 12/2007 Dilley et al. ............... 1/1
7,346,766 B2 * 3/2008 Mackin et al. ........... 713/100
7,356,816 B2 * 4/2008 Goodman et al. ........ 717/172
7,483,757 B2 * 1/2009 Kishore et al. ........... 700/87
7,548,898 B1 * 6/2009 Tarenskeen et al. ........ 1/1
7,571,173 B2 * 8/2009 Yang et al. ............... 1/1
7,720,873 B2 * 5/2010 Loving et al. ........... 707/802
2007/0271434 A1 * 11/2007 Kawamura et al. ...... 711/165

FOREIGN PATENT DOCUMENTS

JP 11-184641 A 7/1999
JP 2006-031367 A 2/2006

* cited by examiner

*Primary Examiner*—Krisna Lim
(74) *Attorney, Agent, or Firm*—Lieberman & Brandsdorfer, LLC

(57) ABSTRACT

A system transition support system guides design of a new system comprised of merged items from a source system and a destination system. The configuration management database (CMDB) provides hardware and software configuration information inherent to each system. A system configuration optimization module is in communication with the CMDB and generates work items required for the system transition and a recommended hardware and software configuration for the new system.

17 Claims, 14 Drawing Sheets

METHOD AND SYSTEM FOR SYSTEM MIGRATION

BACKGROUND OF THE INVENTION

1. Technical Field

This invention relates to migration of two or more computer systems. More specifically, the invention relates to migrating systems based on software and hardware configuration information inherent to each system involved in the migration as provided for by their associated configuration management database.

2. Description of the Prior Art

A configuration management database (CMDB) is a repository of information related to all the components of an information system. Although repositories similar to CMDBs have been used by information technology (IT) departments for many years, the term CMDB stems from information technology infrastructure library (ITIL), which is a framework of best practice approaches intended to facilitate the delivery of high quality information technology services. In the ITIL context, a CMDB represents an authorized configuration of the significant components of the IT environment. A CMDB helps an organization understand the relationships between these components and track their configuration. The CMDB is a fundamental component of the ITIL framework's configuration management process. CMDB implementations often involve the inclusion of data into the CMDB from other sources in such a way that the source of the data retains control of the data.

The CMDB records configuration items (CI) and details regarding the important attributes and relationships between CIs. Configuration managers usually describe CIs using three configurable attributes: technical, ownership, and relationship. The CMDB is integral to configuration management. It enables the consistent, accurate, and cost-effective identification, control, status accounting, and verification of all CIs in the CMDB. The CMDB provides accurate information about hardware, software, and current configuration that enables automated software releases, as well as back-out procedures and project scheduling.

CMDB can discover hardware and software comprising the network. When existing systems are merged into a new system, it is necessary to analyze the hardware and software components of each application within the existing systems to determine their location and role in the new system. In addition, it is necessary to determine whether additional hardware or software will be necessary to maintain performance of the new system. Prior art solutions address migration of a single item, such as a database or storage media, to a new system. For example, JP 2005-31357 and JP1999-184541 both address data migration between a computer and a storage device to maintain continued service during a migration process. In other words, the prior art provides a micro solution, but does not provide a macro solution. Furthermore, neither of these prior art patent applications address the need to provide for optimization of the new system when migrating whole systems. There are many obstacles associated with migrating two or more systems into a new system. A piecemeal approach to the migration of a single component does not address the complicated aspects associated with a large scale migration of entire systems.

Therefore there is a need for a tool that evaluates the merger of two or more computer systems and the software component therein prior to the merge. The system should provide information and guidance on arrangement of integrated software applications on a destination computer system to determine an optimal process for merging the systems.

SUMMARY OF THE INVENTION

This invention comprises a method and system to merge two or more computer systems.

In one aspect of the invention, a method is provided for migrating two computer systems, with each of the systems having a configuration management database (CMDB). One of the computer systems is designated as a source system, and a second of the computer systems is designated as a destination system. The source system is assigned to be merged into the destination system. It is determined which module(s) of the source system should be arranged on which platform of the destination system based upon application configuration items and infrastructure configuration items referenced in both the source CMDB and the destination CMDB. An arrangement of the modules on the destination system is recommend based upon the determination. A new single computer system is formed at the destination system based upon the recommendation and comprised of the two computer systems.

In another aspect of the invention, a computer system is provided with two computer systems. A first computer system has a processor in communication with a first configuration management database (CMDB) and a first Knowledge Base Database. A second computer system has a processor in communication with a second CMDB and a second Knowledge Base Database. One of the computer systems is designated as a source system, and the other of the computer systems is designated as a destination system. The source system is assigned to be merged into the destination system. A manager is provided to determine which module of the source system should be arranged on which platform of the destination system based upon application configuration items and infrastructure configuration items in both the source CMDB and the destination CMDB. The manager recommends an arrangement of the modules on the destination system in response to the determination of items in the source and destination systems. A new single computer system is formed at the destination system based upon the recommendation and comprised of the two computer systems.

In yet another aspect of the invention, an article is provided with a computer readable data storage medium including computer program instructions configured to migrate at least two computer systems. Each system has a configuration management database (CMDB) and a Knowledge Base Database. Instructions are provided to designate one of the computer systems as a source system, and a second of the computer systems as a destination system. The source system is assigned to be merged into the destination system. Instructions are provided to determine which module of the source system should be arranged on which platform of the destination system based on software and hardware configuration information in both the source CMDB and the destination CMDB. Instructions are also provided to recommend an arrangement of the modules on the destination system and to form a new single computer system at the destination system based upon the recommendation and comprised of the two computer systems.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A system transition support system is provided to guide design of a new integrated computer system through the merger of two or more systems. The transition support system determines how to transition configuration items and the estimated cost of the transition based upon both hardware and software configuration items. The transition support system employs a CMDB of each system, Product Information database, Knowledge Base Database, and an Optimization Policy inherent to the user to recommend an information technology system design after transition. In addition, the transition support system takes into account infrastructure configuration items and application configuration items to determine which items can be replaced with other items during system transition and which items cannot be replaced with other items during transition.

Technical Details

A system transition includes the merger of infrastructure configuration items and application configuration items. An infrastructure configuration item (ICI) is a configuration item that is not unique to the system. Examples of ICIs include commonly used software products or hardware products. There are some standard ICIs, such as databases or application servers. Therefore, some of these items may be replaced with another product during system transition. An application configuration item (ACI) is a configuration item that is unique to the system. Examples of ACIs include JAVA applications, HTML content, and database records. ACIs are not in common with other systems, and therefore cannot be replaced with other configuration items during a system transition. An information technology system is the combination and integration of both ICIs and ACIs.

Figure 1:
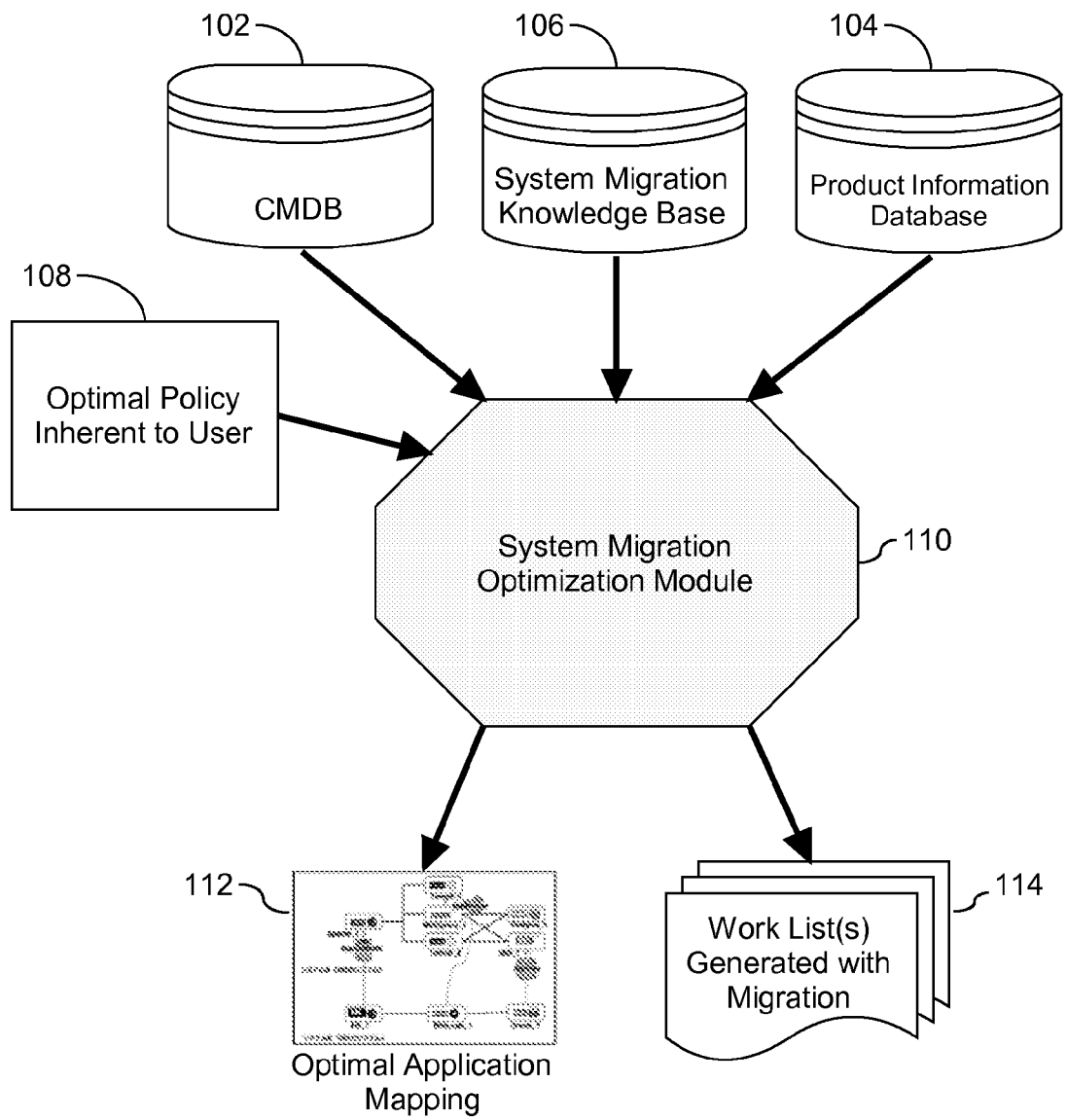
FIG. 1 is a block diagram of the components utilized in a system migration.

FIG. 1 is a block diagram (100) of the components utilized in a system migration. The CMDB (102) is a database that preserves software and hardware configuration information. This database preserves static information, such as software and hardware versions, and also includes information about which application is operating and in which database the data is stored. In addition, the CMDB (102) stores statistical data, such as central processing unit (CPU) usage rate, memory usage, etc. The product information database (104) is a database in which product information for each component of the system is preserved. In one embodiment, the product information database (104) includes a table that maintains a listing of each of the products in the system by product name, version, type, brand, features, support provided, etc. The Knowledge Base Database for system migration (106) is a database in which information, such as application changes and configuration changes for middleware at the time of system migration, are stored. In one embodiment, the Knowledge Base Database for system migration (106) preserves information for optimizing each piece of software and hardware. For example, in one embodiment, the Knowledge Base Database (106) may include a list of each source product together with the destination product, the required work items for the transition, the destination name time, etc. The Optimization Policy inherent to the user (108) is a configuration file or record on that database in which the Optimization Policy inherent to the user is described. For example, when integrating an application on multiple servers into a single server, the policy (108) may provide guidance on what will be required of the destination system, such as CPU usage rate, memory usage, whether or not an open source module is permitted for the database, a priority for a specific database, etc. The CMDB (102), the product information database (104), the Knowledge Base Database for system migration (106), and the policy (108) are each in communication with the system migration optimization module (110). In practice, the system migration optimization module (110) provides a method of conducting system migration based on data maintained in each of the databases and modules (102)-(108). For example, the system migration optimization module (110) analyzes the data maintained in each of the databases and modules (102)-(108) and determines what application should be located in which server, which data should be stored in which database, etc., and provides guidance to the user on operation changes considered to be necessary. Based on the results generated in the system migration optimization module and the Knowledge Base Database (106) regarding the system migration, guidance is provide on operation changes that are necessary for the migration. As shown, the system migration optimization module (110) provides output in the form of an optimal application mapping (112) and a work list (114). The mapping (112) demonstrates a recommended information technology system design after transition from a source system to a destination system. For example, the mapping may illustrate how the configuration items should be placed from a source system into a destination system. Similarly, the work list (114) is provided to a user to identify the steps required for the migration to take affect. In one embodiment, the work list (114) provides a listing of how to transition the hardware and software from the source system to the destination system. The work list may also include estimated costs for the transition, including time and money. Accordingly, the system migration optimization module processes date to provide an optimal migration model and policy to implement the migration.

Figure 2:
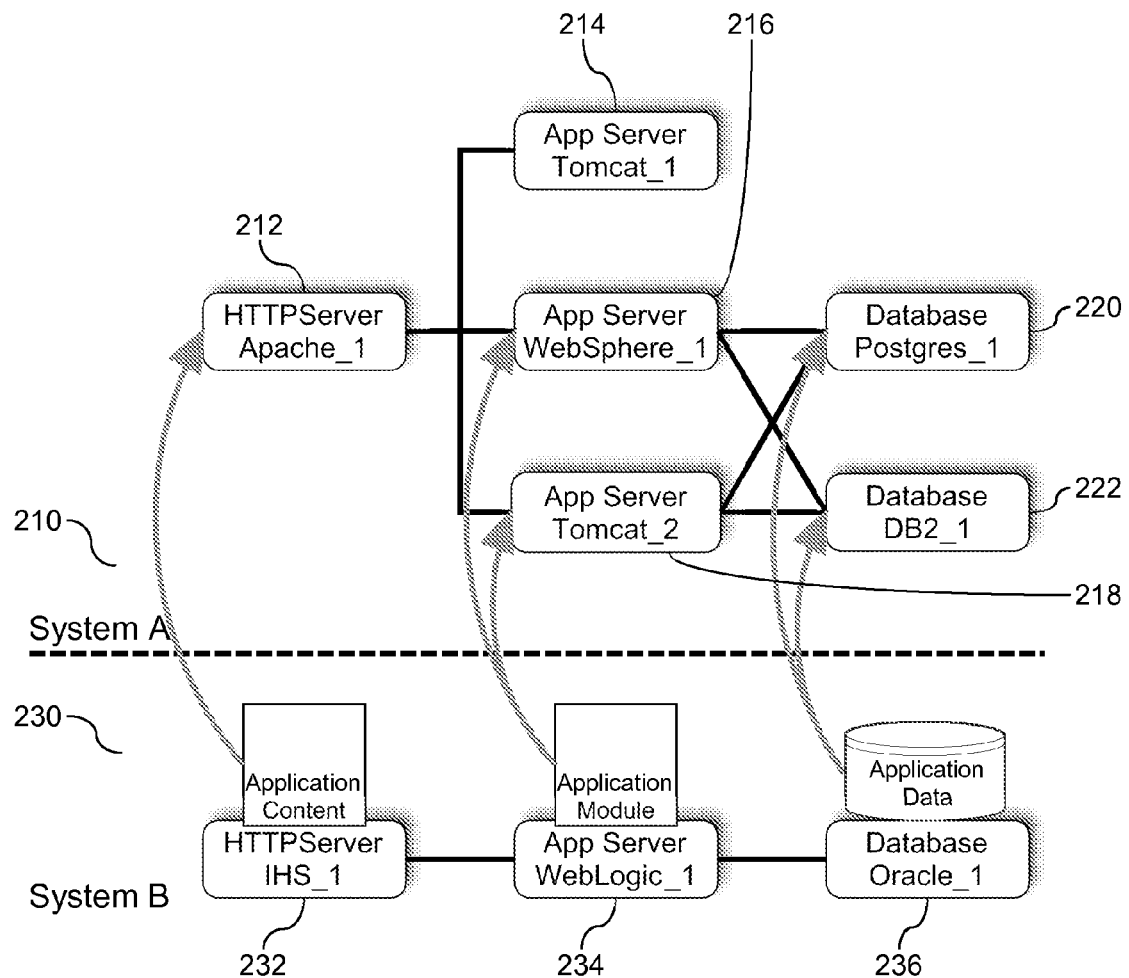
FIG. 2 is a block diagram of two systems that have been designated to be merged according to the preferred embodiment of this invention, and is suggested for printing on the first page of the issued patent.

FIG. 2 is a block diagram (200) of two systems that have been designated to be merged. A first system (210) is designated as the destination system that will absorb the elements of a second system (230), also known as the source system. The destination system (210) has a plurality of components including four servers (212), (214), (216), and (218) and two databases (220) and (222). In one embodiment, server (212) is an HTTP server, and servers (214), (216), and (218) are each application servers. Similarly, the source system (230) has a plurality of components, including two servers (232) and (234) and a database (236). In one embodiment, server (232) is an HTTP server, and server (234) is an application server. For both the source and destination system represented (230), (210), respectively, the lines between the system components show the relation to each other. Accordingly, the two systems shown herein are merely an example of a source system and a destination system, the components therein, and the relationship of the components in each of the systems.

Figure 3A:
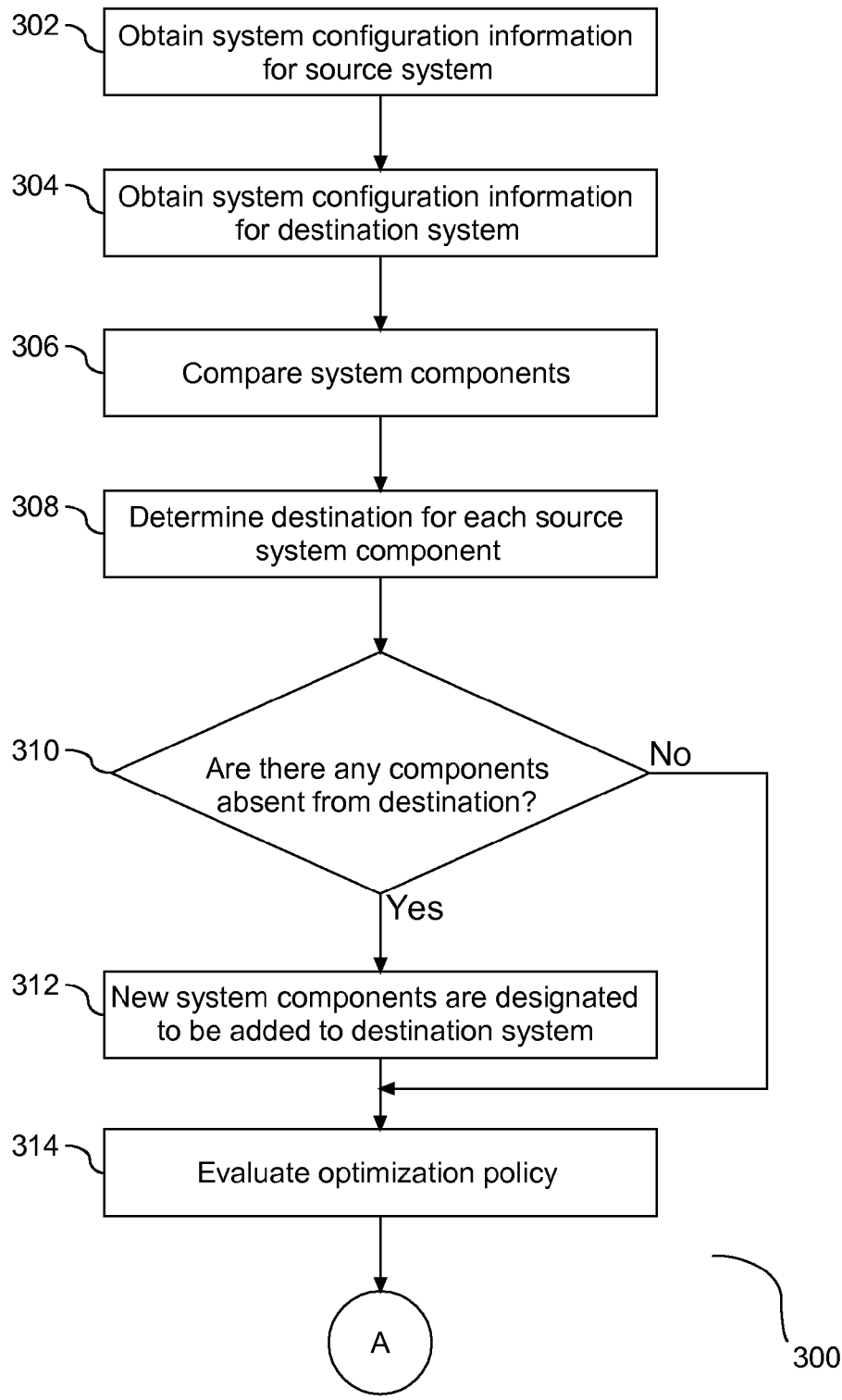
FIGS. 3A and 3B are a flow chart illustrating a general process for merging a source system and a destination system.
Figure 3B:
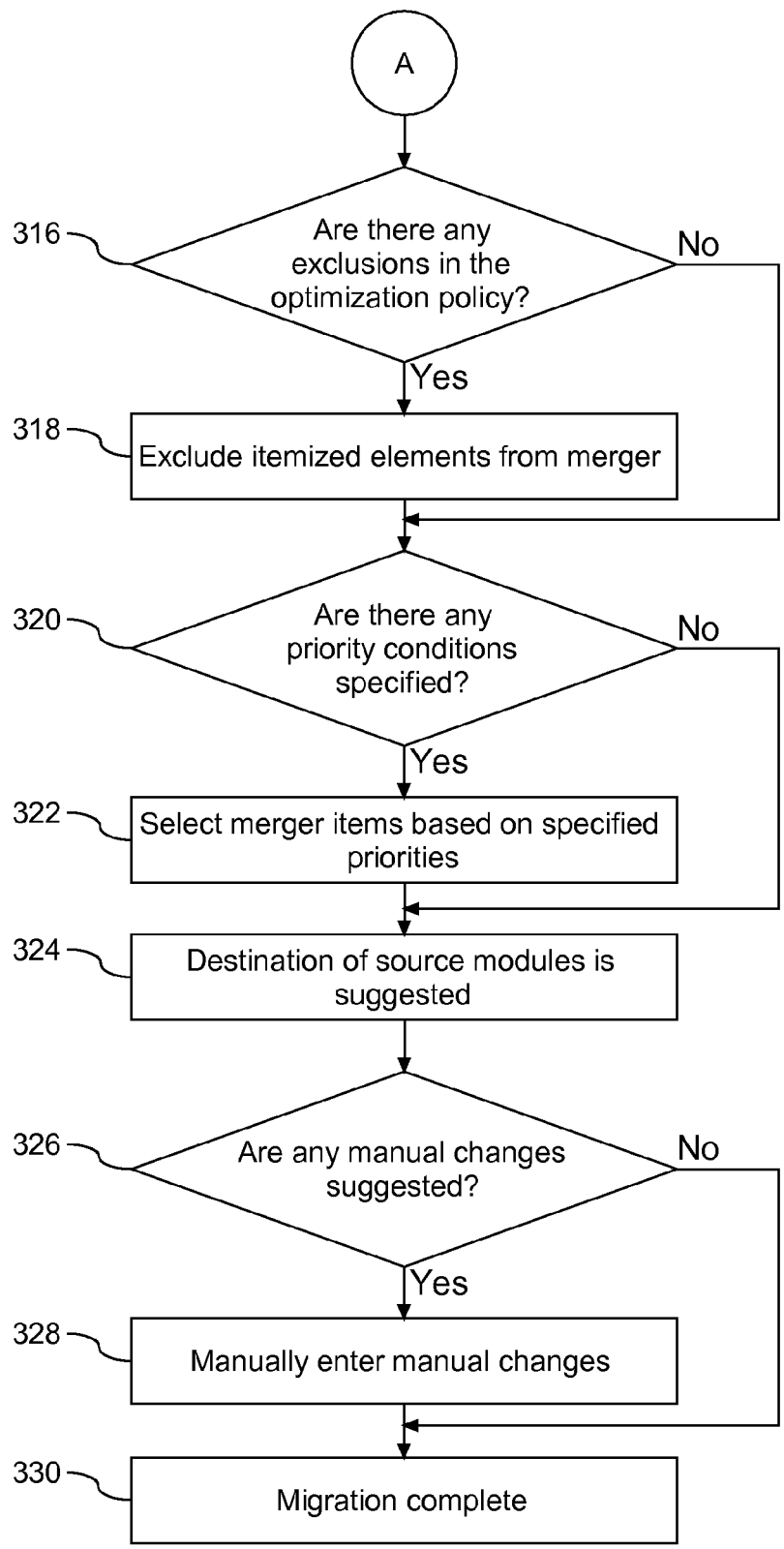

FIGS. 3A and 3B are a flow chart (300) illustrating a general process for merging a source system and a destination system. The process of merging the ICIs and ACIs of both systems is shown in detail in FIGS. 4 and 5 below. Initially, system configuration information is obtained for the source system (302). In one embodiment, the configuration information for the source system is obtained by using information in the CMDB, the Product Information Database, the Knowledge Base Database, and/or the Optimization Policy for the source system. Similarly, system configuration information is obtained for the destination system (304). In one embodiment, the configuration information for the destination system is obtained by using information in the CMDB, the product information database, the Knowledge Base Database, and/or the Optimization Policy for the destination system. A system migration module compares the system components for the source system and for the destination system (306). Following the comparison at step (306), the product information database is used together with the Optimization Policy to merge the components and to determine the destination for each system component. The merge process takes advantage of similar system components in each of the systems subject to the merge. A destination for each of the source system components is determined based upon the data comparison at step (306) from the product information database and the Optimization Policy at step (308). The determination at step (308) includes the functional conditions as well as the status of hardware resources. As part of the process of determining a destination for the merger of the components, it is determined if there are any components absent from the destination (310). If the response to the determination at step (310) is positive, new system components are designated to be added to the destination system (312). Following step (312) or a positive response to the determination at step (310), the Optimization Policy is evaluated to determine if any characteristics of the elements in the merger have been specified (314). Accordingly, the first part of the merge process compares the system components to determine an appropriate destination component.

As part of the process for accounting for the hardware similarities and differences, it is determined whether that are any exclusion conditions provided in the Optimization Policy (316). If it is determined that there are items selected to be excluded, those itemized elements are excluded from the merger (318). In one embodiment, the excluded items may be hardware and/or software components. Following step (318) or a negative response to the determination at step (316), it is determined if any priority conditions for the merger of the items in the systems have been specified in the Optimization Policy (320). In one embodiment, a priority may include the preferred format of the database. If the response to the determination at step (320) is positive, the selection of the merger items is based on the priorities specified (322). Following step (322) or a negative response to the determination at step (320), a destination of source modules is suggested (324). The suggestion includes configuration changes necessary for migration. In one embodiment, the suggestion at step (324) is automated and does not necessitate manual intervention. Similarly, in one embodiment, the suggestion at step (324) includes data provided by the knowledge database. Following the suggested structure of the migration at step (324) it is determined if there are any manual changes suggested (326). If the response to the determination at step (326) is positive, suggestions are manually entered (328). Otherwise, if the response to the determination at step (326) is negative, the migration process is complete (330).

Figure 4A:
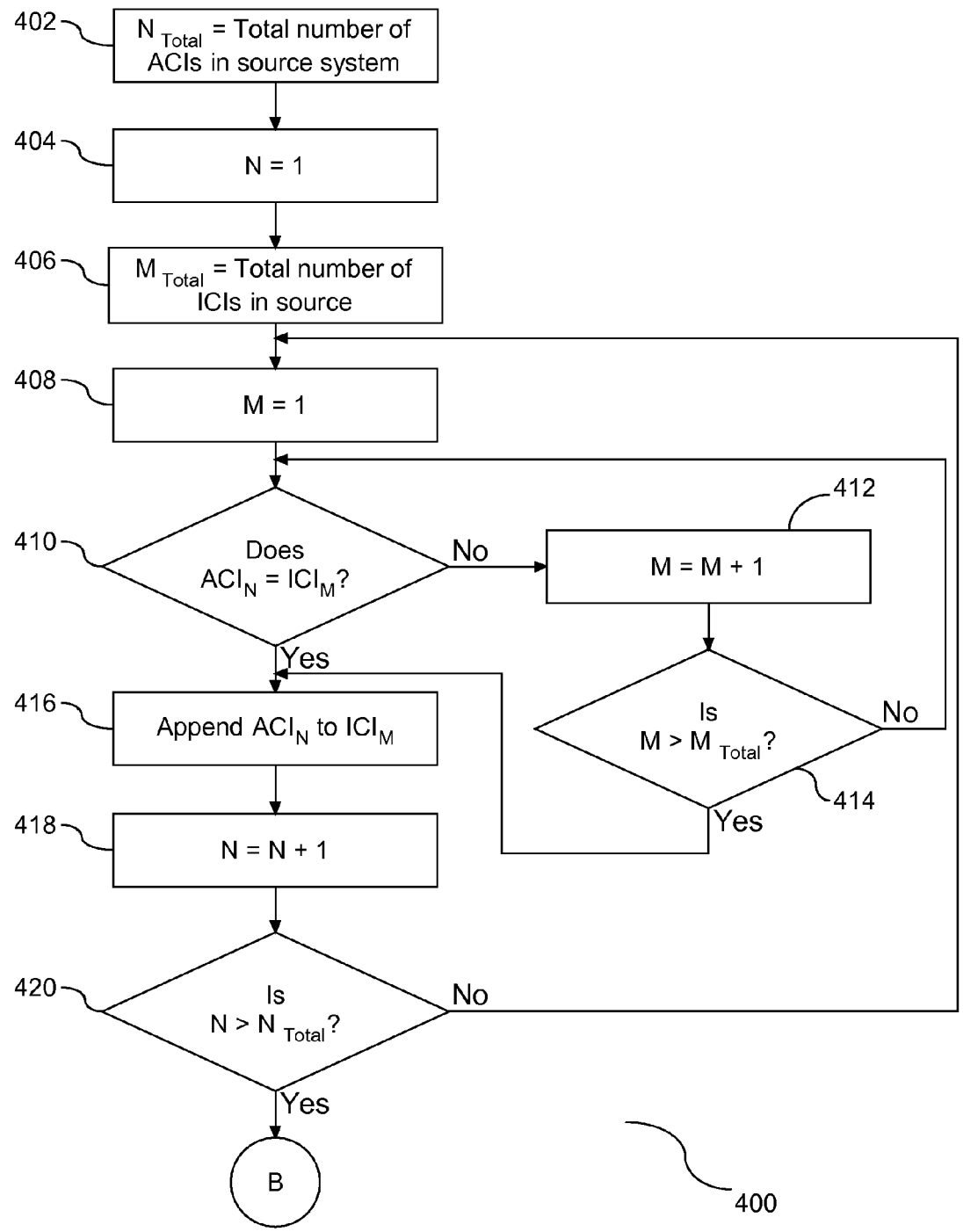
FIGS. 4A and 4B are a flow chart demonstrating a process to select a transition destination for each application configuration item.
Figure 4B:
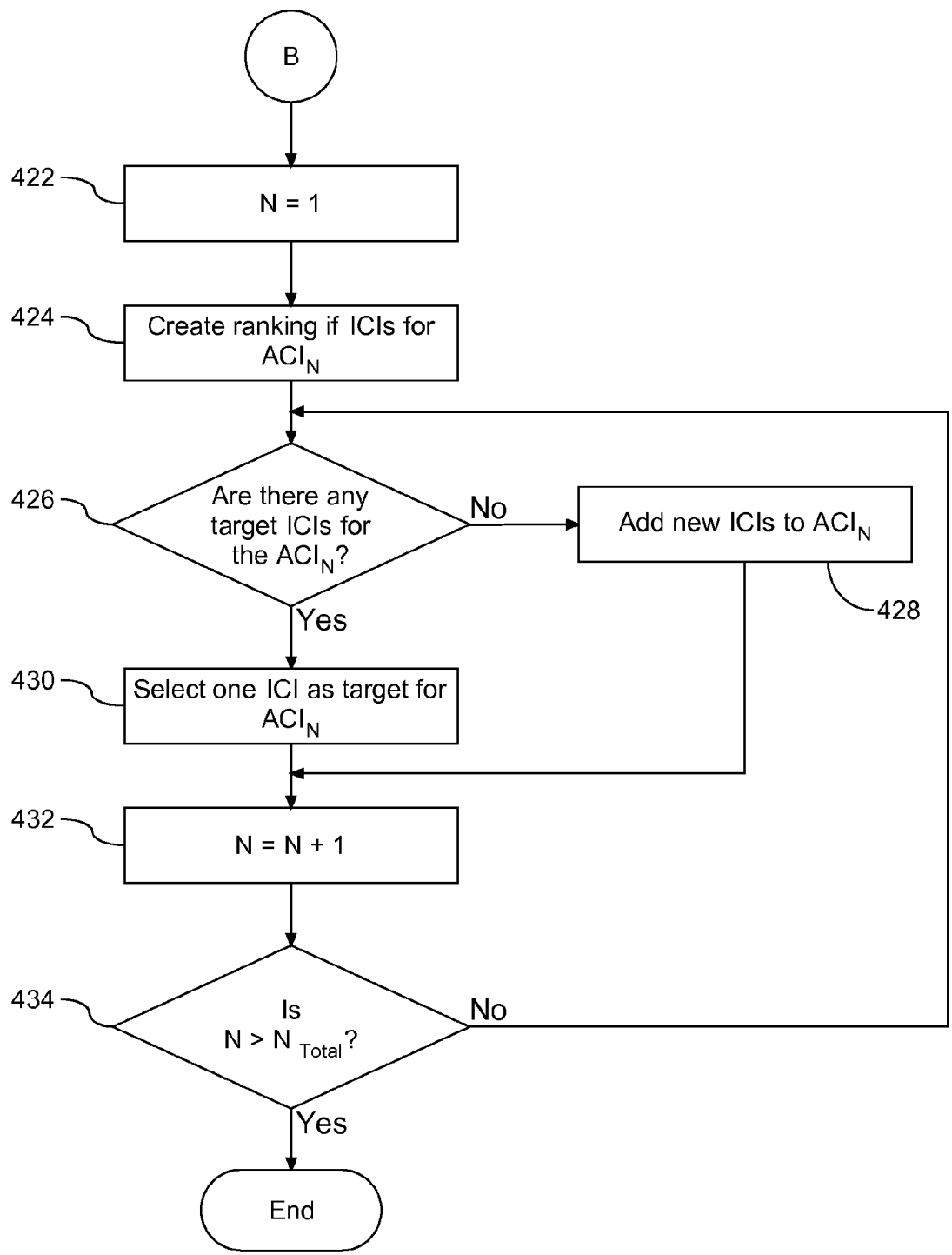

As demonstrated above, the CMDB, product information database, Knowledge Base Database, and Optimization Policy are employed to find an infrastructure configuration which is most suitable to contain the application configuration. In some circumstances, new configuration items are selected and added to the destination system. However, in addition to determining the infrastructure configuration, application configuration items (ACIs) must also transition from the source system to the destination system. FIGS. 4A and 4B are a flow chart (400) demonstrating a process to select a transition destination for each application configuration item. Initially, the total quantity of application configuration items (ACIs) in the source system is obtained and assigned to the variable $N_{total}$ (402), and a counting integer N is assigned the value of one (404). In addition, the total quantity of infrastructure configuration items (ICIs) in the destination system is assigned to the variable $M_{total}$ (406), and an associated counting integer M is assigned the value of one (408). A first application configuration, $ACI_N$ is selected in the source system and it is determined whether the type of $ACI_N$ is the same as the type of $ICI_M$ (410). In one embodiment, the determination at step (410) includes determining whether $ACI_N$ is compatible with $ICI_M$. For example if $ACI_N$ is a database item from DB2 and $ICI_M$ is a database items from an Oracle database, it would be judged that $ACI_N$ and $ICI_M$ are compatible because both items are database items. However, if $ACI_N$ is a database item from DB2 and $ICI_M$ is an item from an application server, it would be judged that $ACI_N$ and $ICI_M$ are not compatible. Accordingly, the determination at step (410) confirms whether or not the items subject to comparison are compatible.

If the response to the determination at step (410) is negative, the integer M is incremented (412) followed by a determination as to whether the incremented integer exceeds the total quantity of ICIs in the destination system (414). A negative response to the determination at step (414) is followed by a return to step (410). A positive response to the determination at step (410) results in appending $ACI_N$ to $ICI_M$ (416). Following step (416) or a negative response to the determination at step (414), the integer N is incremented (418). It is then determined if the integer N exceeds the total quantity of application configuration items (ACIs) in the source system (420). A negative response to the determination at step (420) is followed by a return to step (408) where the integer M is reset to one. However, if the response to the determination at step (420) is positive, this is an indication that all of the ACIs in the source system have been reviewed to determine compatibility with each of the ICIs in the destination system. Accordingly, the first part of the transition of ACIs is to determine compatibility of each ACI with each ICI.

Once the comparison is complete, the integer N is reset to one (422) and a ranking of the ICIs is created for $ACI_N$ (424). Details of the ranking process are shown in FIG. 5. Based upon the rankings, it is determined whether there are any destination ICIs for $ACI_N$ (426). A negative response to the determination at step (426) will result in adding a new ICI to correspond to $ACI_N$ (428). In one embodiment, the ACI will be deployed on the new ICI. In contrast a positive response to the determination at step (426) will result in selecting one of the ICIs in the ranking at step (424) as a destination ICI for $ACI_N$ (430). Thereafter, the integer N is incremented (432), followed by a determination as to whether the integer N exceeds the total quantity of ACIs in the source system (434). A negative response to the determination at step (434) will return to step (426) for a review of destination ICIs for the next $ACI_N$, and a positive response will conclude the process of selecting destination ICIs for source ACIs. Accordingly, the selection process reviews each of the ICIs and ACIs and ranks them for the matching process.

Figure 5A:
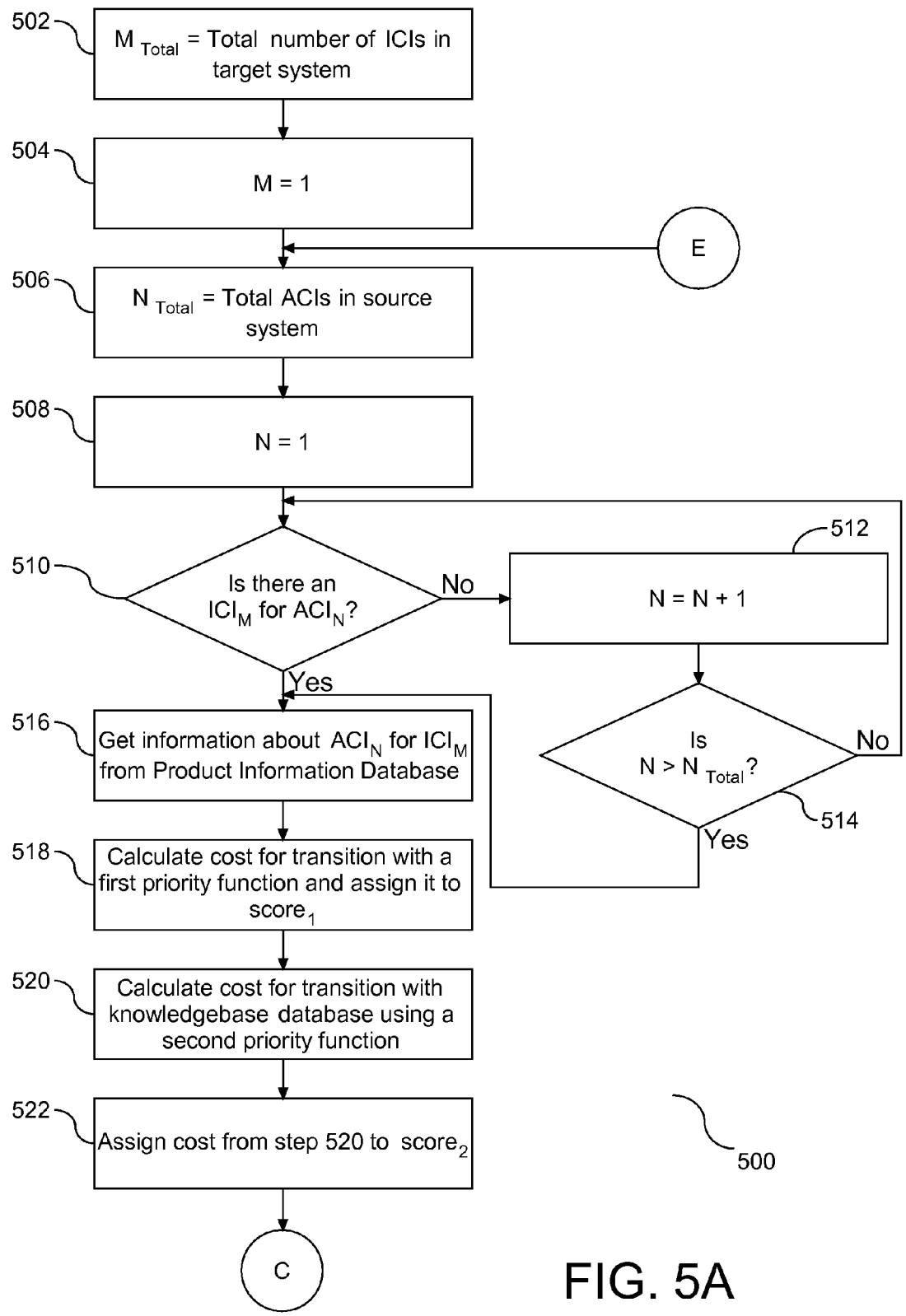
FIGS. 5A, 5B, and 5C are a flow chart illustrating a process for ranking a transition destination of each application configuration item.
Figure 5C:
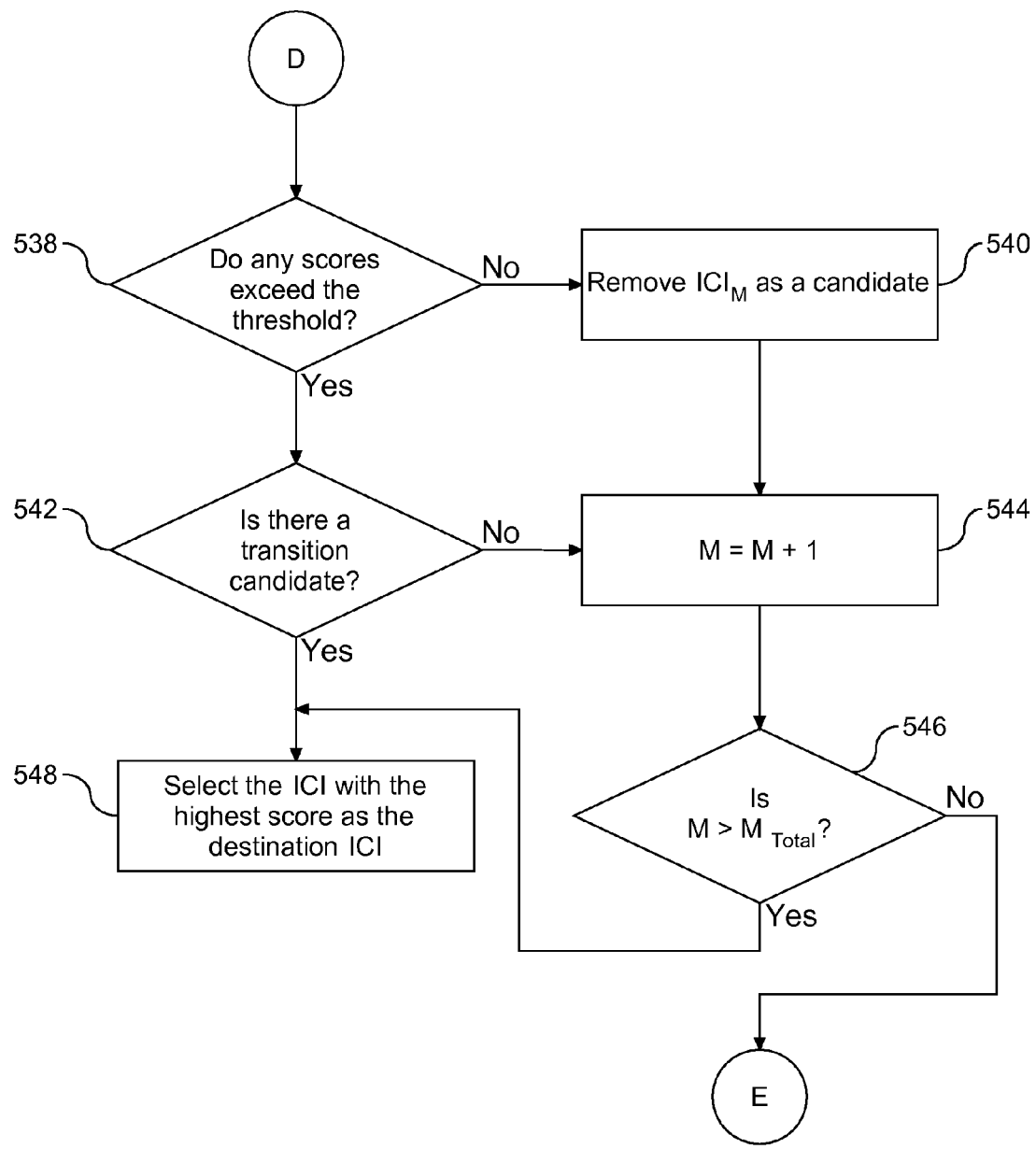
Figure 5B:
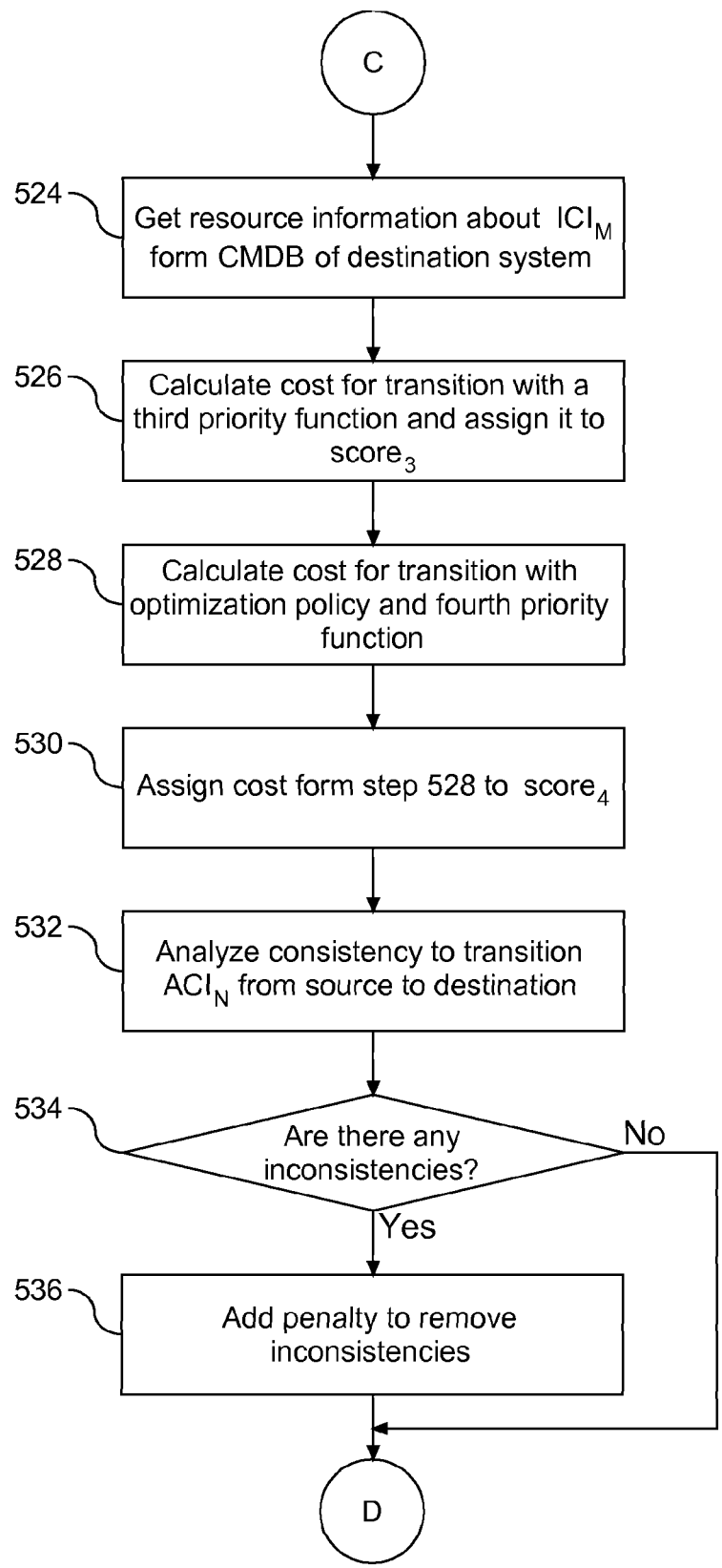

As shown as step (424), a ranking of the ICIs in a destination system is created for each ACI in a source system. FIGS. 5A, 5B, and 5C are a flow chart (500) illustrating a process for ranking a transition destination of each ACI. The variable $M_{Total}$ is assigned to the total quantity of ICIs on the destination system (502), and the variable M is assigned to the integer value of one (504). Similarly, the variable $N_{total}$ is assigned to the total quantity of ACIs in the source system (506), and the variable N is assigned to the integer value of one (508). For each ACI in the source system it is determined if there is an appropriate ICI on the destination system (510). If the response to the determination at step (510) is negative, the variable N is incremented (512) followed by a determination as to whether the variable N exceeds the value assigned to $N_{total}$ (514). A negative response to the determination at step (514) is followed by a return to step (510). Similarly a positive response to the determination at step (514) or a positive response to the determination at step (510) is followed by obtaining information about $ACI_N$ for $ICI_M$ from the product information database (516). A first cost is calculated for the system transition of $ACI_N$ to $ICI_M$ using a first priority function and the product information database, and the cost is assigned to the variable $score_1$ (518). A second cost is then calculated for the system transition for $ACI_N$ to $ICI_M$ using the Knowledge Base Database (520). The cost at step (520) is calculated for the system transition of $ACI_N$ to $ICI_M$ using a second priority function and the Knowledge Base Database (520), and the cost is assigned to the variable $score_2$ (522). Similarly, resource information about $ICI_M$ is obtained from the CMDB of the destination system (524). A third cost is calculated for the system transition of $ACI_N$ to $ICI_M$ using a third priority function with the information from the CMDB of the destination system, and the calculated cost is assigned to the variable $score_3$ (526). Finally, the Optimization Policy is employed to calculate a fourth cost for the system transition of $ACI_N$ to $ICI_M$ with the use of a fourth priority function (528). The cost calculated from step (528) is assigned to the variable $score_4$ (530). Accordingly, the first part of the ranking process is to assign a cost for the system transition of $ACI_N$ to $ICI_M$ with each of the Product Information Databases, the Knowledge Base Databases, the CMDBs, and the optimization policies.

Once a score has been assigned to each projected cost, the consistency of the transition of each $ACI_N$ from the source system to the destination system is analyzed (532). It is then determined if there are any inconsistencies in the analysis (534). In one embodiment the consistency is judged by co-relation information stored in the CMDB. For example, if one application module on a WebSphere Application Server which has access to a database is transferred to another system which has two WebSphere Application Servers, with only one of these two servers having access to a database, the application module can only be deployed on the server with access to the database. A deployment of the module to a server without access to the database will result in addition of a penalty. If there are any inconsistencies, a penalty is added to remove the inconsistency (536). In one embodiment, the penalty may be an added cost. Following step (536) or a negative response to the determination at step (534), it is determined if any of the scores as calculated with the four priority functions exceed a set threshold (538). A negative response to the determination at step (538) is followed by removing $ICI_M$ as a candidate for the transition (540). However, a positive response to the determination at step (538) is followed by a determination as to whether there are any candidates for the transition (542). A negative response to the determination at step (542) or following step (540) is followed by an increment of the variable M (544), and a determination as to whether the incremented value of the variable M exceed the total quantity of ICIs in the destination system (546). A negative response to the determination at step (546) is followed by a return to step (506), and a positive response to the determination at steps (546) or (542) is followed by a selection of the ICI with the highest score as the destination ICI (548). In one embodiment, the determinations may be inverted and the selection at step (548) would be the ICI with the lowest score. Accordingly, as demonstrated herein, the database and modules of the system are each employed to determine selection of an ICI for a system transition.

Figure 6A:
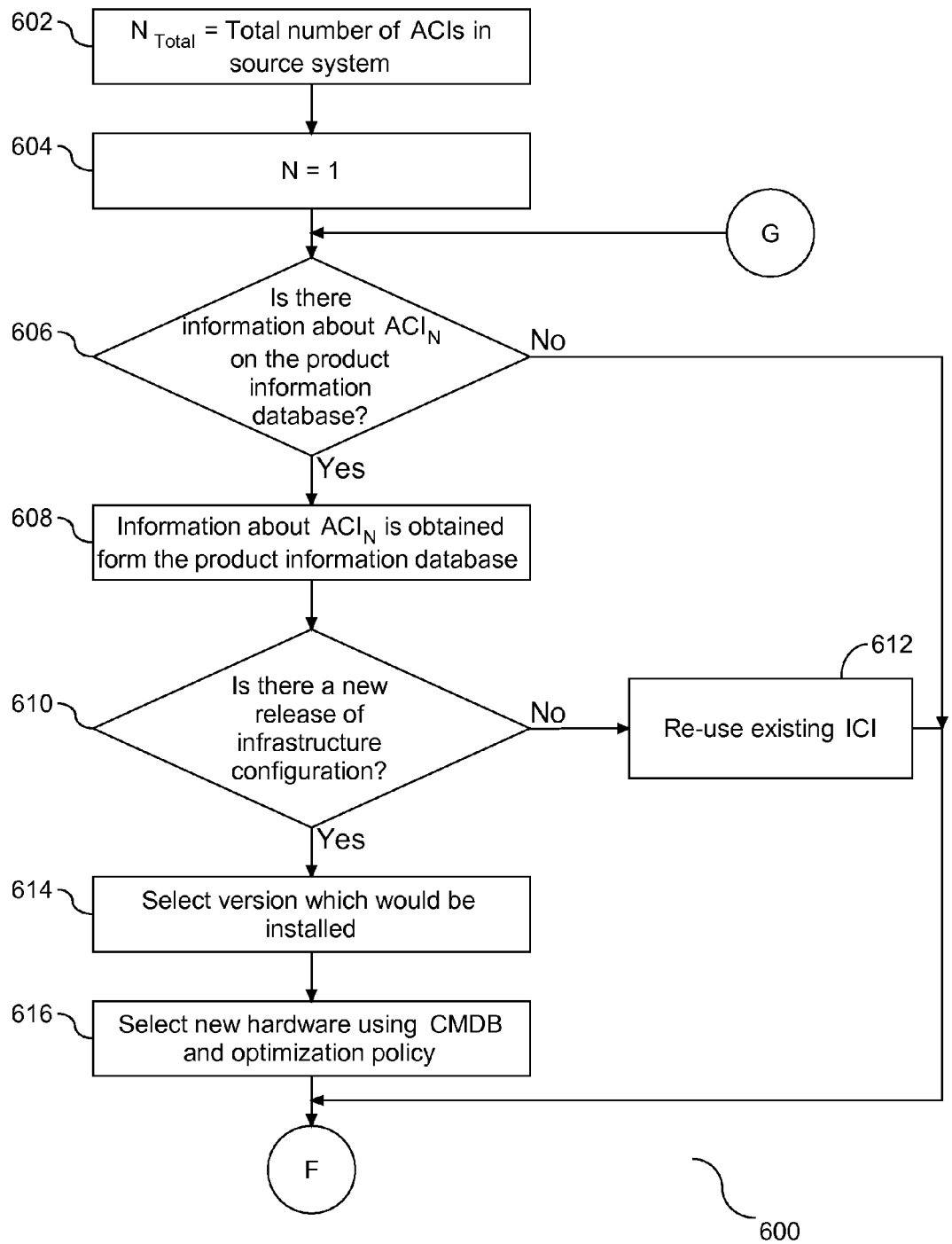
FIGS. 6A and 6B are a flow chart illustrating a process for appending a new ICI part in the destination system.
Figure 6B:
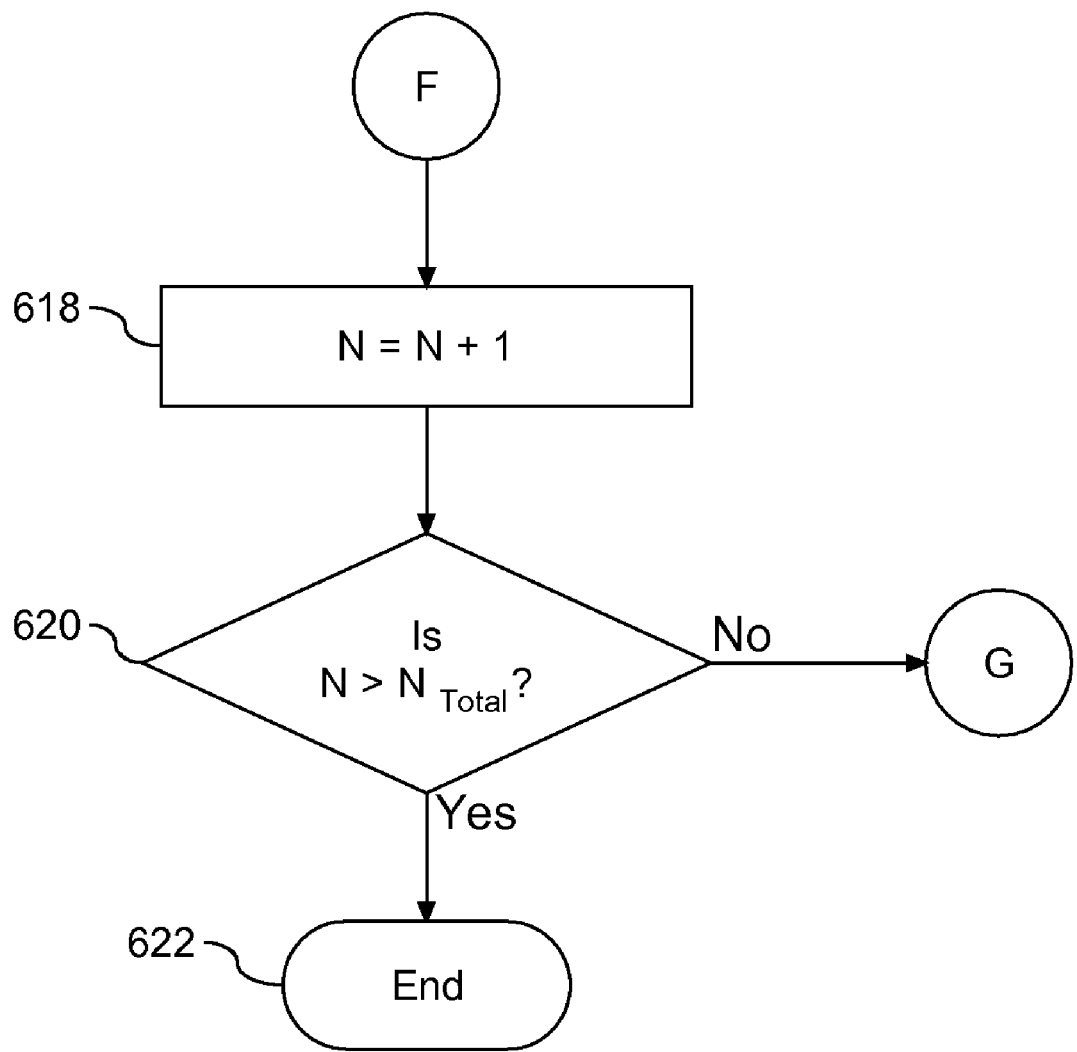

As shown in FIGS. 3A and 3B, and FIGS. 4A and 4B, ACIs transition to existing ICIs in a destination system. FIGS. 6A and 6B are a flow chart (600) illustrating a process for appending a new ICI to the destination system. Initially, the variable $N_{total}$ is assigned to the total quantity of ACIs in the source system (602), and the variable N is assigned to the integer value of one (604). A determination is conducted as to whether there is information on the Product Information Database about the $ACI_N$ which would be appended to the destination system (606). If it is determined that the information is present, information about $ACI_N$ is obtained from the Product Information Database (608). Thereafter, it is determined if there is a newer release of the infrastructure configuration which would be appended to the destination system (610). If the response to the determination at step (610) is negative, the existing ICI is re-used (612). However, if the response to the determination at step (610) is positive, the version which would be installed is selected by using the Product Information Database and the Optimization Policy (614). Thereafter, new hardware is selected and/or added to the destination system by using the CMDB together with the Optimization Policy (616). In one embodiment, existing hardware may be re-used. Following steps (612) or (616), the process for appending a new ICI part is concluded. If at step (606) it is determined that the information is not present or following steps (612) or (616), the variable N is incremented (618) followed by a determination as to whether the incremented value of N exceeds the variable $N_{Total}$ (620). A negative response to the determination at step (620) will result in a return to step (606) for review of the next $ACI_N$. Similarly, a positive response to the determination at step (620) is an indication that each of the ACIs has been reviewed for selection of a transition destination (622).

Figure 7A:
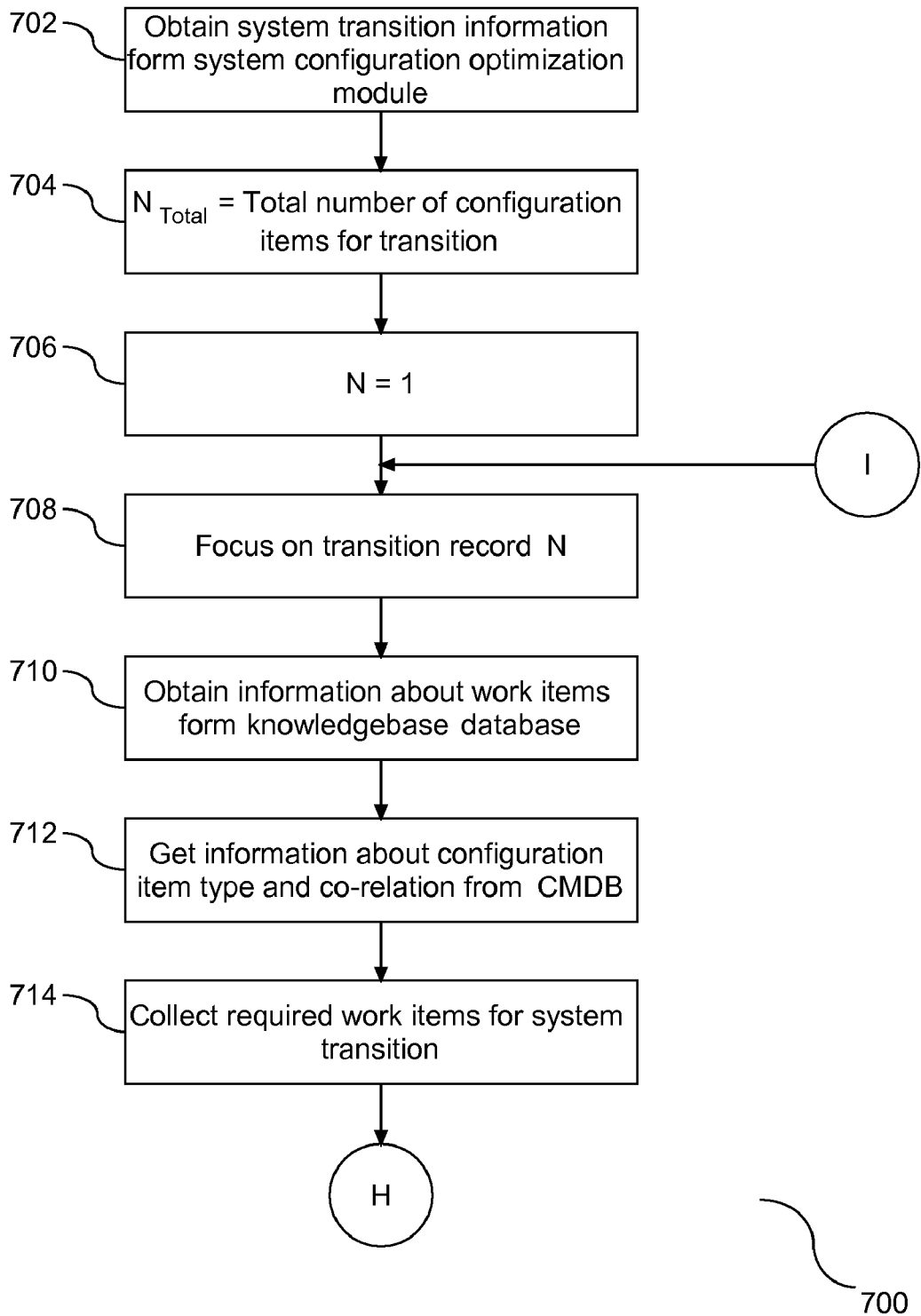
FIGS. 7A and 7B are a flow chart illustrating a process for generating work items for a system transition.
Figure 7B:
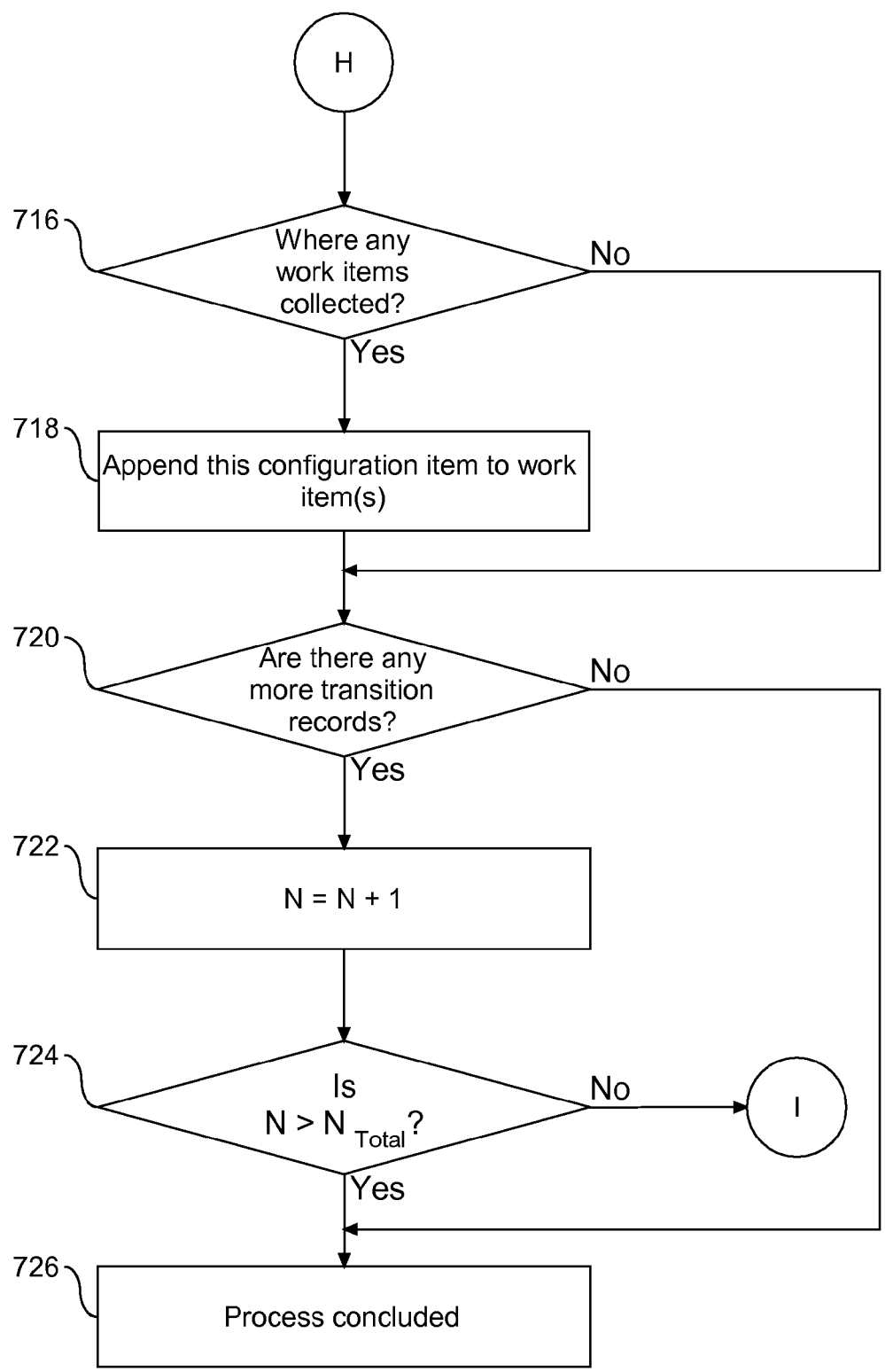

In a merger of systems that both include like items with different formats, work items may need to be generated. For example, a database of a source system may be an Oracle database and a database of a destination system may be a DB2 database. A work item or multiple work items are a listing of how to transition hardware and software from the source system to the destination system. In one embodiment, the work item is a structure query language (SQL) format, and the SQL format of the destination system is modified based upon a change in an associated application server and database parameters of the new single computer system. This transition may require a determination as to whether the structured query language needs to be modified and similar transition concerns. In one embodiment, the system configuration optimization module, the CMDB, and the Knowledge Base Database communicate with a work item generation module to create required work items for a system transition. FIGS. 7A and 7B are a flow chart (700) illustrating a process for generating work items for a system transition. Initially, system transition information regarding the method of transitioning each configuration item is obtained from the system configuration optimization module (702). From the system configuration optimization module it is determined how many configuration items are the subject of the transition, the variable $N_{Total}$ is assigned to this determined quantity (704). The variable N is a counting variable and it is assigned to the integer one (706). For one transition record (708), $record_N$, information about work items in the system transition, such as possible work items or co-relationship which have influences, is obtained from the Knowledge Base Database by using source configuration information type and destination configuration information type as a key (710). In addition, information about configuration item type and co-relation is obtained from the CMDB and compared to the work item information from the Knowledge Base Database (712). In one embodiment, co-relation pertains to the relationship of the hardware elements in the respective system. The required configuration is dependent on a co-relation of the hardware elements. For example, configuration for a WebSphere Application Server for DB2 is different than a configuration for a WebSphere Application Server for an Oracle Database. In addition, required work items for the system transition of the focused configuration item is collected (714). Following step (714), it is determined if there are any work items (716) as a result of the information obtained at steps (710), (712), and (714). If the response is positive, this configuration item is appended to a list as a work item (718) which is reported to the user. Following step (718) or following a negative response to the determination at step (716), it is determined if there are more transition records in the system configuration optimization module (720). A positive response to the determination at step (720) will result in accessing the next transition record. In one embodiment the variable N is incremented (722) and compared to the variable $N_{total}$ (724). If it is determined that there are more records that are the subject of the transition, the process returns to step (708). However, if at step (724) it is determined that there are no more records that are the subject of the transition or following a negative response to the determination at step (720), this is an indication that there are no more transition records subject to review and the process concludes (726).

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 8:
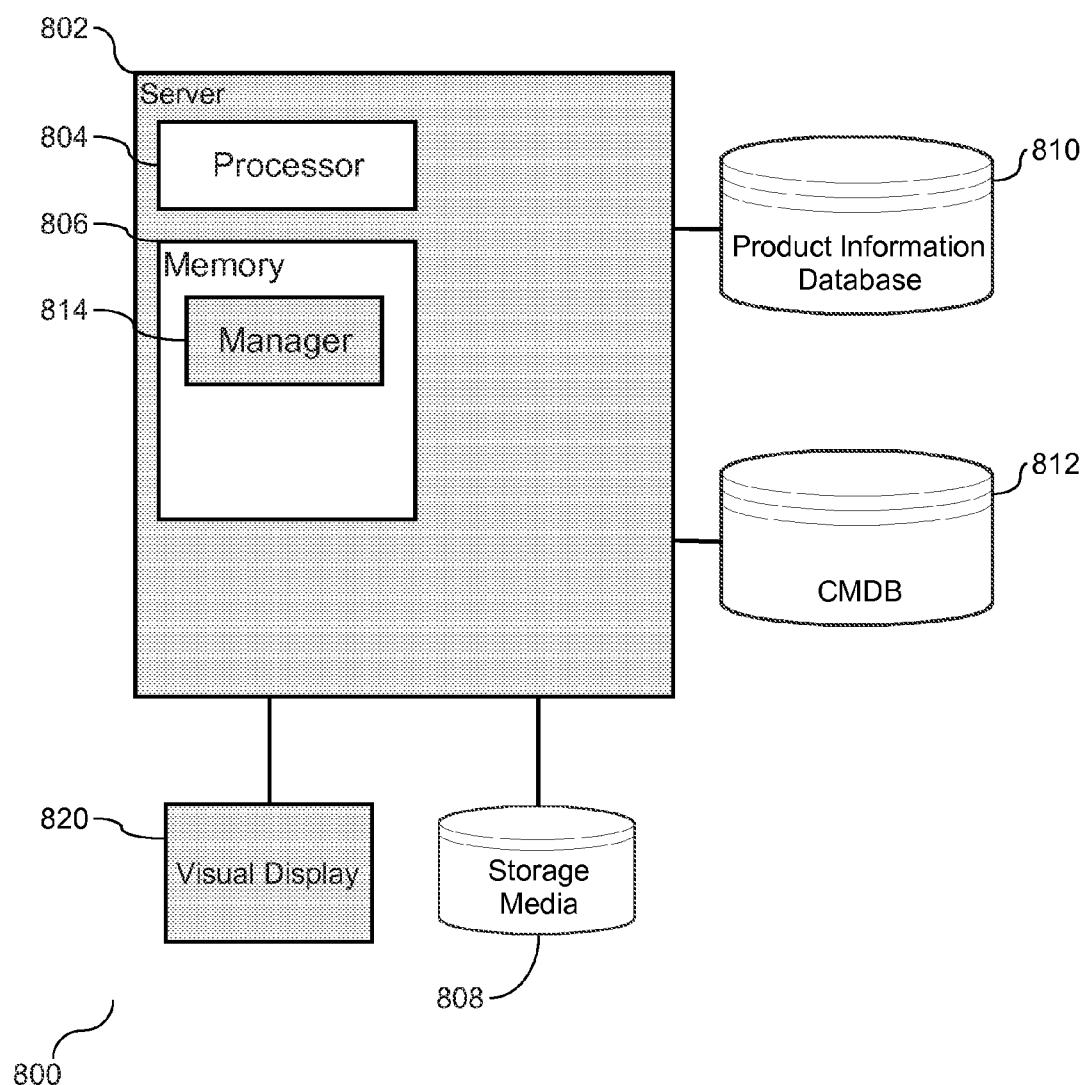
FIG. 8 is a block diagram illustrating placement of the system merge tool in a computer system.

FIG. 8 is a block diagram (800) illustrating placement of the system merge tool in a computer system. The illustration shows a server (802) with a processor (804), and memory (806) in communication with storage media (808) and a visual display (820). As shown in FIG. 1, the server (802) is in communication with a product information database (810) and a CMDB (812). The databases (810) and (812) maintain the information necessary to facilitate the integration and/or merge of two computer systems. A system merge tool to determine an arrangement of modules in the merged system and to recommend and facilitate execution of the arrangement in the form of a manager (814) is shown residing in memory (806) of the server (802). The manager (814) communicates with the visual display (820) to facilitate communication of the determined arrangement of modules prior to a merge of the two systems. The recommended arrangement of modules may be presented to a user interface on the visual display (820). The manager (814) may utilize instructions in a computer readable medium to enable modification to the recommended arrangement of merge modules, such as a graphical user interface. Similarly, in one embodiment, the manager (814) may reside as a hardware tool external to memory (806), or it may be implemented as a combination of hardware and software. Accordingly, the manager (814) may be implemented as a software tool or a hardware tool to facilitate integration of both hardware and software configuration items in a merger of two systems.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Based on software and hardware configuration information inherent to each system provided by CMDB, their products information, and information from a related Knowledge Base Database, transition work is supported by suggesting the optimal configuration at the time of infrastructure migration. Guidance as to which modules of a source application should be arranged in which platform of the destination system is provided. The guidance is based upon software and hardware configuration information for the source and destination system as stored in the associated CMDBs of each system. In one embodiment, the guidance includes recommendation(s) for additional hardware and software to facilitate the transition, if necessary. Furthermore, application side changes such as modification of SQL and change of application server and database parameters may be suggested if deemed necessary to support the transition.

Alternative Embodiments

It will be appreciated that, although specific embodiments of the invention have been described herein for purposes of illustration, various modifications may be made without departing from the spirit and scope of the invention. In particular, in one embodiment, a graphical user interface (GUI) may be provided to demonstrating each component of the source and destination systems. Each of the components is represented as icons on an associated visual display. A graphics symbol is employed to show the relationship of the components on the GUII. Each of the icons may be manually moved across the systems to manually configure the merged system. Accordingly, the scope of protection of this invention is limited only by the following claims and their equivalents.

I claim:

1. A method for migrating computer systems, comprising the steps of:
   providing two computer systems, with each system having a configuration management database (CMDB);
   designating one of said computer systems as a source system, and a second of said computer systems as a destination system, wherein said source system is assigned to be merged into said destination system;
   determining which module of said source system should be arranged on which of platform of said destination system based upon application configuration items and infrastructure configuration items referenced in both the source CMDB and the destination CMDB;
   employing a system migration optimization module to analyze system migration based on data maintained in each of the databases and to create required work items for said system transition;
   recommending an arrangement of said modules on said destination system based upon said determination; and
   forming a new single computer system at said destination system based upon said recommendation and comprised of said two computer systems.

2. The method of claim 1, further comprising said system migration optimization module employing a knowledge base data base to create a work item to accompany said migration, wherein said work item provides a listing of how to transition hardware and software from the source system to the destination system.

3. The method of claim 2, wherein said work item is a structure query language format, and further comprising modifying structured query language of said destination system based upon a change in an associated application server and database parameters of said new single computer system.

4. The method of claim 1, further comprising said system optimization module providing an application mapping to a visual output to demonstrate a recommended information technology system design after transition from the source system to the destination system.

5. The method of claim 1, further comprising employing a graphical user interface with each component of the source and destination systems represented as icons on an associated visual display, and said graphical user interface supporting manual configuration of said merged system through manual movement of said icons.

6. The method of claim 1, wherein the step of determining which module of said source system should be arranged on which platform of said destination system includes determining a concrete destination using information on a product information database and information on an optimization policy inherent to a user.

7. A computer system, comprising:
   a first computer system having a processor in communication with a first configuration management database (CMDB) and a first knowledge base database;
   a second computer system having a processor in communication with a second CMDB and a second knowledge base database;
   one of said computer systems designated as a source system, and a second of said computer systems designated as a destination system, wherein said source system is assigned to be merged into said destination system;
   a manager to determine which module of said source system should be arranged on which platform of said destination system based upon application configuration items and infrastructure configuration items in both the source CMDB and the destination CMDB;
   said manager to employ a product information database and an optimization policy inherent to a user to determine which module of said source system should be arranged on which platform of said destination system;
   said manager to recommend an arrangement of said modules on said destination system in response to said determination of items in said source and destination systems; and a new single computer system formed at said destination system based upon said recommendation and comprised of said two computer systems.

8. The system of claim 7, further comprising a system migration optimization module employed to analyze system migration based on data maintained in each of the databases and to create required work items for said system transition.

9. The system of claim 8, further comprising said system migration optimization module to employ said knowledge base database to create a work item to accompany said migration, wherein said work item provides a listing of how to transition hardware and software from the source system to the destination system.

10. The system of claim 9, wherein said work item is a structure query language format, and further comprising a modification of said structured query language of said destination system based upon a change in an associated application server and database parameters of said new single computer system.

11. The system of claim 7, further comprising said system optimization module to provide an application mapping to a visual output to demonstrate a recommended information technology system design after transition from the source system to the destination system.

12. The system of claim 7, further comprising a graphical user interface with each component of the source and destination systems represented as icons on an associated visual display, and said graphical user interface supporting manual configuration of said merged system through manual movement of said icons.

13. An article of manufacture comprising:
a computer readable data storage medium including computer program instructions configured to merge at least two computer systems, with each system having a configuration management database (CMDB) and a knowledge base database, said instructions comprising:
instructions to designate one of said computer systems as a source system, and a second of said computer systems as a destination system, wherein said source system is assigned to be merged into said destination system;
instructions to determine which module of said source system should be arranged on which platform of said destination system based on software and hardware configuration information in both the source CMDB and the destination CMDB;
instructions to create required work items for said system transition through employing a system migration optimization module to analyze system migration based on data maintained in each of the databases, wherein said work item provides a listing of how to transition hardware and software from the source system to the destination system;
instructions to recommend an arrangement of said modules on said designation system; and
instructions to form a new single computer system at said destination system based upon said recommendation and comprised of said two computer systems.

14. The article of claim 13, wherein said work item is a structure query language format, and further comprising modifying structured query language of said destination system based upon a change in an associated application server and database parameters of said new single computer system.

15. The article of claim 13, further comprising instruction to provide an application mapping to a visual output to demonstrate a recommended information technology system design after transition from the source system to the destination system.

16. The article of claim 13, further comprising employing a graphical user interface with each component of the source and destination systems represented as icons on an associated visual display, and said graphical user interface supporting manual configuration of said merged system through manual movement of said icons.

17. The article of claim 13, wherein the instruction to determine which module of said source system should be arranged on which platform of said destination system includes determining a concrete destination using information on a product information database and information on an optimization policy inherent to a user.

* * * * *